United States Patent [19]
Hehn et al.

[11] Patent Number: 5,779,092
[45] Date of Patent: Jul. 14, 1998

[54] BAFFLE SYSTEM FOR TANK

[75] Inventors: Ronald L. Hehn, Hawley, Minn.; John Cain, Goodyear, Ariz.

[73] Assignee: Mega Corporation, Albuquerque, N. Mex.

[21] Appl. No.: 787,519

[22] Filed: Jan. 22, 1997

Related U.S. Application Data

[60] Provisional application No. 60/027,312 Oct. 1, 1996.

[51] Int. Cl.⁶ .................. B60P 3/00; F17B 1/14
[52] U.S. Cl. .................. 220/563; 137/574; 137/582; 220/501
[58] Field of Search .................. 220/563, 562, 220/565, 566, 567, 501, DIG. 24; 210/241, 320, 521; 137/582, 574, 573, 262; 244/128, 135 R, 135 C

[56] References Cited

U.S. PATENT DOCUMENTS

| | | |
|---|---|---|
| 1,392,892 | 10/1921 | Imber . |
| 1,640,471 | 8/1927 | Staley . |
| 1,844,868 | 2/1932 | Davis, Jr. . |
| 2,011,161 | 8/1935 | Robinson, Sr. . |
| 2,036,607 | 4/1936 | Robinson . |
| 2,427,853 | 9/1947 | Goodlett .................. 244/135 C |
| 2,850,083 | 9/1958 | Frost .................. 244/135 C |
| 4,251,005 | 2/1981 | Sons et al. . |
| 4,308,815 | 1/1982 | Conway . |
| 4,611,724 | 9/1986 | Watkins et al. . |
| 4,858,778 | 8/1989 | Patrick .................. 220/563 X |

*Primary Examiner*—Allan N. Shoap
*Assistant Examiner*—Niki M. Kopsidas
*Attorney, Agent, or Firm*—Arnold, White & Durkee

[57] ABSTRACT

The tank and baffle system comprises a tank for transporting liquids, having a plurality of baffles for controlling surges and excess liquid movement produced by movement of the tank. The present invention is particularly useful where there is a large ratio of tank width to tank support and lateral bending loads may be in excess of longitudinal bending. The baffles are rigidly secured to a tunnel structure that spans longitudinally from the front to the rear of the tank, and forms a continuous structure in both longitudinal and transverse directions. A further aspect of the invention is the use of chamfered corners on the baffle plates to provide fluid communication between chambers of the tank, as well as to reduce surging of the liquid contents and reduce or eliminate joint fatigue. Access ports in the baffles that are covered by access covers during use are another aspect of the invention.

19 Claims, 11 Drawing Sheets

BAFFLE SYSTEM FOR TANK

BACKGROUND OF THE INVENTION

This application claims priority on U.S. Provisional Application Ser. No. 60/027,312 by Ronald Hehn et al., filed Oct. 1, 1996.

This invention relates to tanks for containing liquids, and in particular tanks that are transported from one location to another such as those mounted on a vehicle or trailer. It is particularly applicable to tanks employed in vehicles, but is also useful for stationary tanks as well.

Tanks used in transportation of fluids are typically elongated tubular shells with a series of internal baffles spaced longitudinally along the axis of the shell and oriented transversely to this axis. Other internal baffles may be orientated in a longitudinal direction.

Baffles come in many shapes and sizes, and generally are sized to contact the internal surface of the shell, providing rigidity and strength to the tank. Baffles may also provide the necessary control for surging and wave motion of the liquid cargo, particularly when the tank undergoes a rapid acceleration or deceleration. Moreover, when the level of liquid in the tank is less than full, such forces are amplified to a much greater degree. In addition to longitudinal forces exerted by the liquid cargo, turning or banking of the tank may cause lateral or transverse liquid movement, resulting in tank instability, and ultimately, instability of the vehicle.

A selection of tanks utilizing flat or curved baffles, including cylindrical baffles, may be found in, for example, patents to Sons et al., U.S. Pat. No. 4,215,005, Watkins et al., U.S. Pat. No. 4,611,724, Imber, U.S. Pat. No. 1,392,832. None of these patents, either singly or in combination, discloses the present invention.

The joints securing conventional baffles to the tank shell or other internal structure may suffer cracks and early failure, primarily due to stresses induced by liquids impacting the baffle surface, and stresses resulting from uneven fluid distribution inside the tank. Moreover, it has been observed that greater stresses may occur at the point where corners of baffles or other plates intersect and join each other. This may be especially true in tanks that are constructed where the ratio of the tank width to the width of the tank support is about 5:1 or greater. Tanks manufactured according to this ratio have the advantage of providing for an increased fluid volume without increasing the length or height of the tank to unacceptable proportions.

Because of added stresses associated with increasing the tank width, however, there exists a need for a tank that provides for less maintenance of internal structures with greater stability of the liquid cargo when the tank is subjected to changes in direction, or is moved over uneven surfaces.

SUMMARY OF THE INVENTION

The present invention provides a solution to these and other problems associated with movement of liquid in a tank by providing an improved baffle system that provides integral and continuous longitudinal and transverse structural stability while preventing excessive movement of product during transport. This results in a highly stable platform not found in existing tank designs.

It is a feature of the invention to provide baffles with specially sized and placed access ports that are covered by access covers during use. This provides a lower ballast of liquid in the tank in which a wave and associated surge is decreased or may not be produced, even when the tank is subjected to accelerations produced by for example, an uneven roadway or braking of the vehicle. Thus, the design helps to decrease not only longitudinal forces exerted by the liquid cargo, but during turning or banking of the tank, lateral or transverse liquid movement is also decreased.

It is another feature of the invention to provide an efficient load carrying structure that is lightweight, easily manufactured, inherently stiff, self jigging, and fatigue resistant. This is accomplished in part by utilizing a continuous structure in both longitudinal and transverse directions. In this manner, local stiffening of heads and baffles may be reduced or eliminated. Moreover, the shape of the baffle to baffle stiffening, utilizing longitudinal, horizontal, and vertical baffles, limits stress concentrations that are generally associated with localized stiffening of a flat panel.

In certain aspects of the invention, where there is a large ratio of tank width to tank support width, for example as a truck frame, lateral bending loads may be in excess of longitudinal bending. The present invention provides a continuous transverse structure that when connected to the tank shell forms what may be considered deep I-beams. These transverse I-beams are formed by the combination of the vertical baffles and the upper and lower skins of the tank shell.

In other aspects, the tank may be mounted on a vehicle frame or fixed frame where the ratio of tank width to frame width may be greater than 5:1, and in other aspects, the ratio of tank width to frame width may be 8:1, 6:1 or 3:1. It is recognized that a tank design utilizing the transverse I-beam formed according to the present invention may be useful in tanks of practically any width to support ratio.

The present invention utilizes as its base a box structure, termed a tunnel, that serves as the main sump area towards which all compartments are connected. This structure comprises internal baffle plates oriented in a transverse direction that contribute to the continuity of the transverse baffles that are outside of the tunnel. In certain aspects, the tunnel structure is located from the base of the lower hull of the tank to about ⅓ of the tank height above the floor of the tank. In other aspects, the tunnel structure may be about ¼ or about ½ of the tank height above the floor of the tank.

It is a further feature of the invention to provide a box structure that serves as a jig for placement of the transverse baffles and vertical heads. The box structure also serves as an interface for mounting points between the vehicle frame and the tank.

In other aspects of the invention, horizontal baffles are placed in the tank to provide additional structural support and wave or surge suppression. The longitudinal baffles are located at approximately the same height as the tunnel structure, for example, about ⅓ of the tank height above the floor of the tank. The horizontal baffle thus serves to support the vertical heads and baffles near the centroid of the pressure distribution.

The upper portions of the vertical heads and baffles are also supported by longitudinal baffles that form a continuous longitudinal structure, termed a barrel, that also houses and temporarily limits the movement of liquid. The barrel assumes a cross sectional shape resembling the external shell of the tank, but at proportionally reduced dimensions. This provides in essence a "shell within a shell" that contributes to structural stability of the internal components and serves to limit liquid movement.

A further aspect of the invention is the use of chamfered corners on the internal plates and baffles. Where panels or baffles intersect in more than two planes, welds in these intersecting corners are subject to weakening, cracking, and ultimately failure. By chamfering the corners of the plates at the corners of intersection, orifices are provided for fluid communication between the internal chambers of the tank. The chamfered corners of the panels at the points of intersection thus provide two important advantages over current tank designs. First, these corners allow fluids to flow between chambers without surging, and second, the fatigue problem associated with joints of this nature is reduced or eliminated. It is also recognized that while welding is the preferred method of attaching components of the tank together, other methods of securing these parts in the present configuration, such as bolting, are contemplated as within the scope of the present invention.

As used herein, "chamfered" refers to corners of baffles and plates that are cut at a predetermined angle. Removal of a portion of the corner prevents this area of the plate from contacting the adjacent structure, and provides an orifice for fluid communication. This angle may be from about 10 degrees to about 70 degrees, with the angle preferably being about 45 degrees. The amount of material removed from the plate corners is dependent on the amount of fluid communication required between adjacent chambers of the tank, or the amount of stress reduction at the corners of baffle plates, and is within the scope of the skilled artisan to determine after the benefit of this disclosure.

The present invention also provides for a plurality of larger orifices, or access ports, that are placed into the baffles to provide access between adjacent compartments of the tank for the manufacture, cleaning, or coating of the interior of the tank. The access ports may be in the center of a plate or baffle, or they may be offset from the center. The access ports located on the horizontal baffle and lower box structure may be closed by a removable cover for effective wave suppression.

An access port is typically a circular hole cut in a baffle that allows ingress/egress between various compartments of the tank. With regard to the present invention, circular access ports are located near the tops of the vertical baffles for this purpose. Access ports are also located in the horizontal baffles. However, due to the nature of this design in which a lower ballast of water is desired with limited movement for effective wave suppression, these access ports must be sealed. To facilitate access to these lower compartments, a readily removable, yet self-locking cover is provided. When the cover is placed over the orifice and rotated approximately ninety degrees, it locks into place. When the locking mechanism is actuated and the cover is rotated an additional ninety degrees, the cover is readily removed.

A further observation that lends itself to the current invention is that the human torso is not circular, but rather of an elliptical shape. Rather than a true ellipse, two equal arcs subtending 180 degrees and separated by a distance greater than their radii produce an acceptable shape that is easily manufactured and lends itself to a self locking access cover.

The access cover may be either rectangular or assume the shape as the access port itself, yet of increased dimensions such that coverage of the access port is assured. Tabs are placed to sandwich the access port parallel to the short dimension of the panel, yet at a distance greater than that dimension of the access port, ensuring engagement of those tabs along the non-radius portion of the access port. Because the dimension of the lips of this tab are greater than the locking point of the access port, the access panel must be placed in the access port along the long dimension of the access port, then rotated ninety degrees at which point vertical motion of the panel is prevented by engagement of those tabs into the baffle plate.

Since vertical motion is now prevented, further rotation of the panel must be prevented such that the locking tabs do not disengage. A self-locking feature is provided so that human error is minimized, as well as to prevent loss of parts such as retaining pins, bolts, etc. During rotation into the locking position, a spring loaded pin located along the long axis of the panel contacts the plate through which the access port has been cut. This spring loaded pin is located such that it contacts the maximum longitudinal radius of the access port, and the path the pin follows during additional rotation of the access panel results in positive contact between the path of the pin and the radius of the access port. The access port panel is a flat plate, which may have parallel slots cut in line with and adjacent to the pins of such width to produce an integral spring. When removing the covers, the spring loaded pins are lifted vertically, thus clearing the pins from the radius of the access port allowing a 90 degree rotation of the panel so that it may be removed. To prevent vertical motion of those pins of such degree that permanent deformation of the integral springs results, the vertical travel of these pins at the location of the pins is limited by a mechanical stop.

The slots cut in the access port cover panel to produce the integral springs also allows a small amount of fluid communication between compartments, and the amount of fluid communication may be regulated by the size of the slots.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
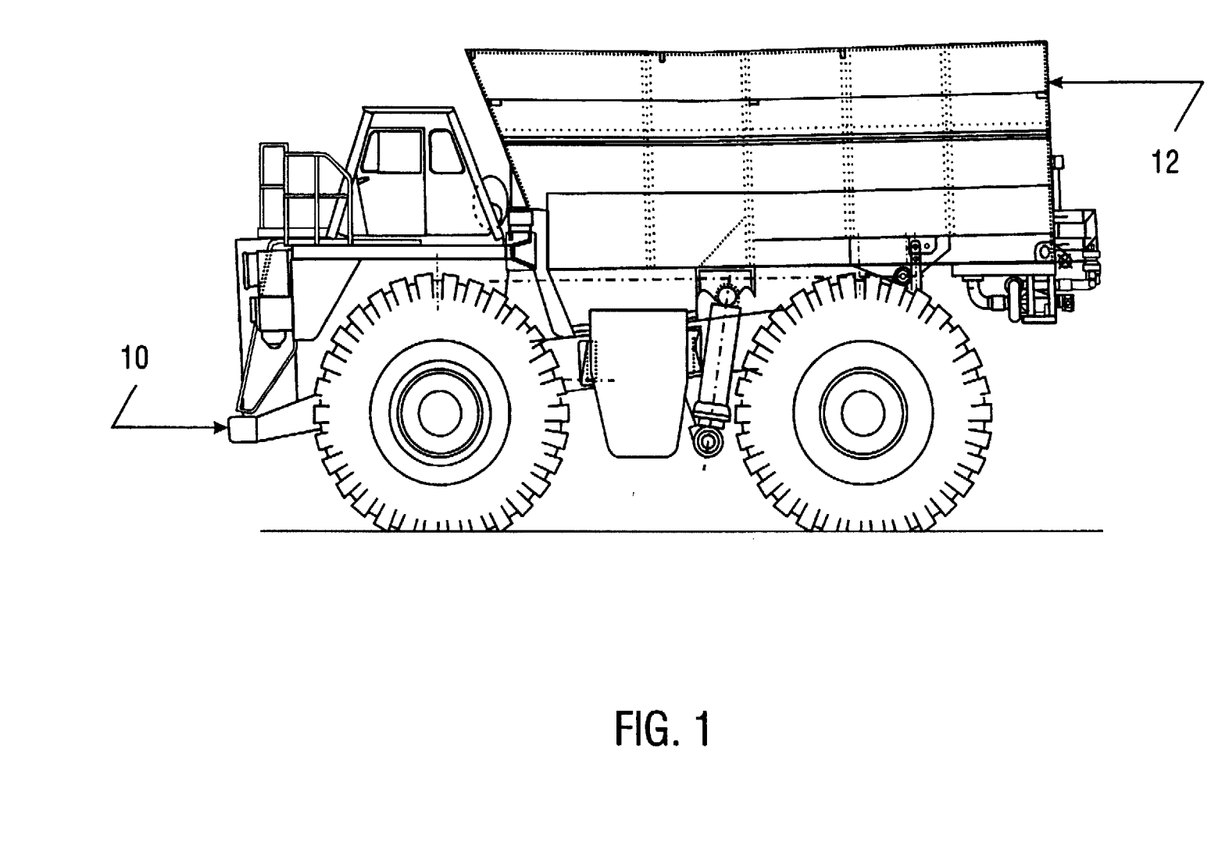
FIG. 1 depicts the tank of the present invention mounted on a truck.

FIG: 1 shows a representative vehicle 10 for carrying tank 12 that is made according to the present invention. It is also recognized that tank 12 may be mounted on a ship, in an aircraft, or other such conveyance. Tank 12 may also be stationary and either fixed or supported by ground.

Figure 2:
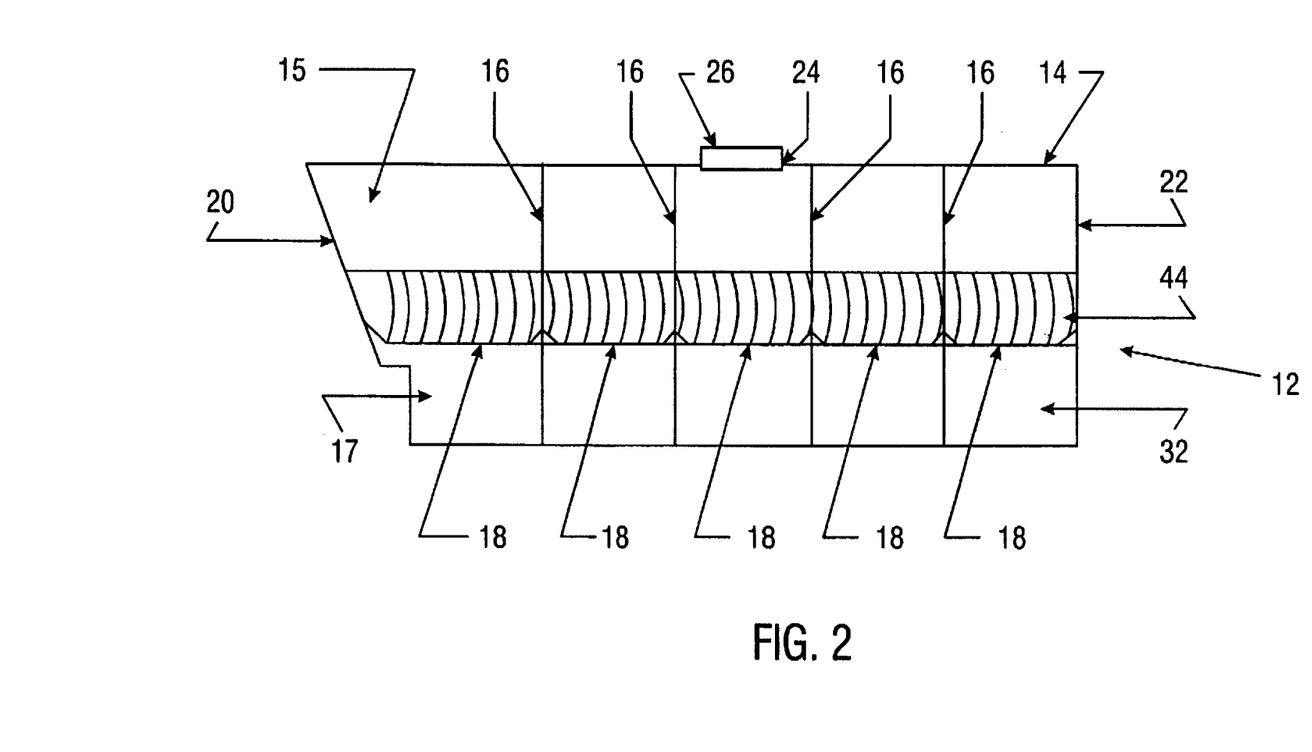
FIG. 2 is a side sectional view of the tank, showing the location of the baffles.

FIG. 2 is a side cut away view through shell 14 of tank 12 showing the placement of vertical baffles 16 that extend transversely across the longitudinal axis of tank 12. Vertical baffles 16 are welded to tunnel 32 and shell 14. Horizontal baffles 18 are at approximately the same height and planar with the top of tunnel 32, and extend outwardly from the top of tunnel 32 to shell 14, forming upper chamber 15 and lower chambers 17. Horizontal baffle 18 is welded to tunnel 32, vertical baffles 16, and shell 14. Longitudinal baffles 44 are rigidly secured to horizontal baffles 18 between adjacent vertical baffles 16, between vertical baffle 16 and rear bulkhead 22, and between vertical baffle 16 and front bulkhead 20. Access into the tank is by tank entrance port 24, which allows filling of the tank as well as ingress and egress of maintenance personnel. Tank entrance port 24 may be closed by cover 26.

Figure 3:
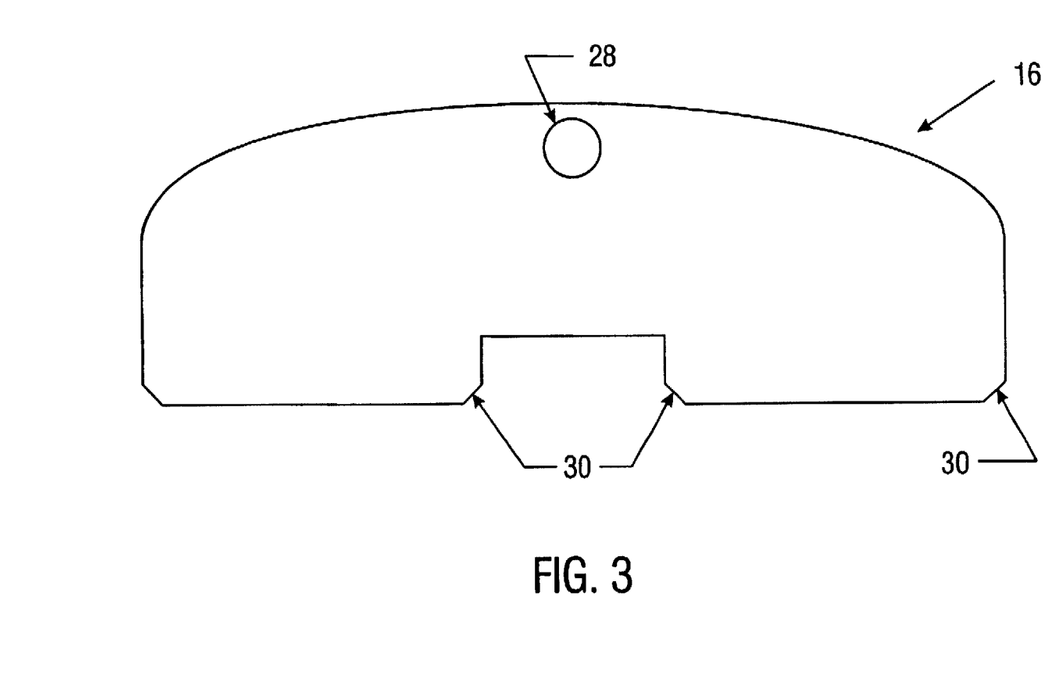
FIG. 3 shows a representative vertical baffle.

FIG. 3 depicts vertical baffle 16, showing access port 28. Access port 28 is configured to allow human access to the various chambers inside tank 12 for building, cleaning, and repair. Chamfered corners 30 provide fluid communication from either side of baffle 16, and reduce or prevent buildup of mechanical stress at the corners, which may lead to weld failure.

Figure 4:
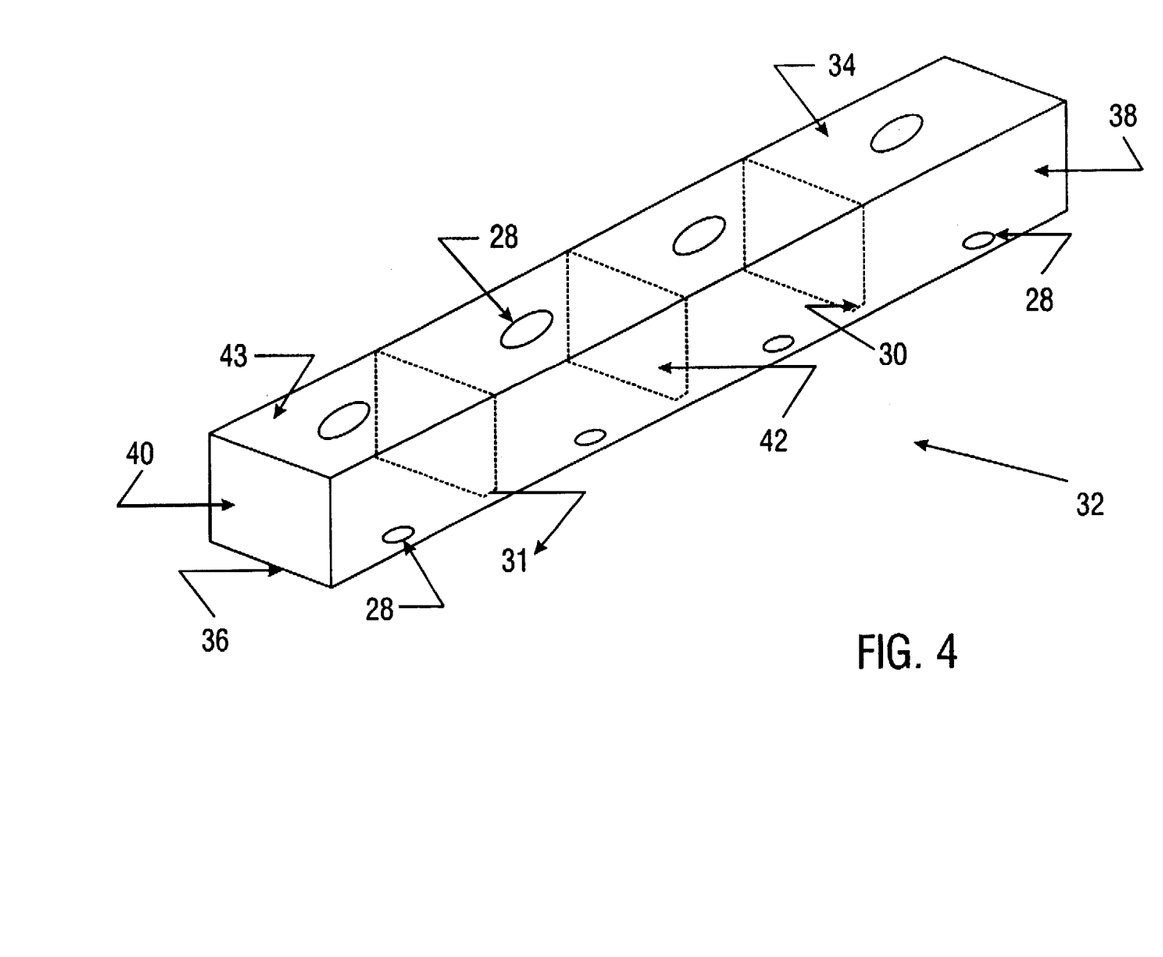
FIG. 4 is a perspective view of the tunnel with access ports. The tunnel forms the base of the tank.

FIG. 4 shows in greater detail tunnel 32. Tunnel 32 comprises a top plate 34, two side plates 38, a bottom plate 36, and two end plates 40. Top plate 34 is provided with access ports 28 to allow access to the interior of tunnel 32. At least one tunnel baffle 42 is oriented transversely inside tunnel 32 to reduce wave or surging within the interior of tunnel 32. Chamfered corner 30 on tunnel baffle 42 provides corner orifice 31 that permits fluid communication between internal box chambers 43 formed between baffle 42. Additional plate orifices 28 are located in side plates 38 and top and bottom plates 34 and 36 to provide fluid communication between tunnel chambers 43 and the tank 12 interior.

Figure 5:
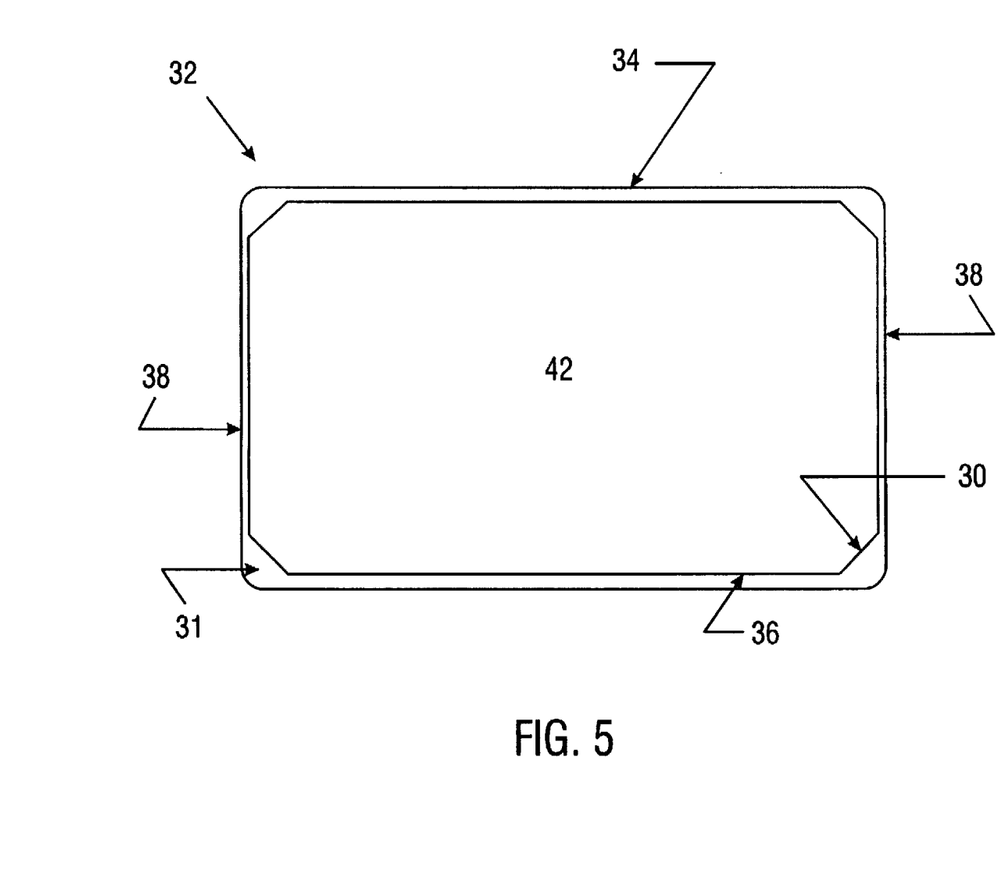
FIG. 5 is an end perspective view of the box, showing the location and orientation of a representative box baffle with chamfered corners.

FIG. 5 depicts an end perspective of tunnel 32, comprising tunnel top 34, tunnel bottom 36, and tunnel sides 38. Tunnel baffle 42 with chamfered corner 30 forming corner orifice 31 is rigidly secured transversely inside tunnel 32 by welding or other suitable means of attachment. Corner orifice 31 permits fluid communication inside of tunnel 32, while reducing or eliminating surges along the internal length of tunnel 32.

Figure 6:
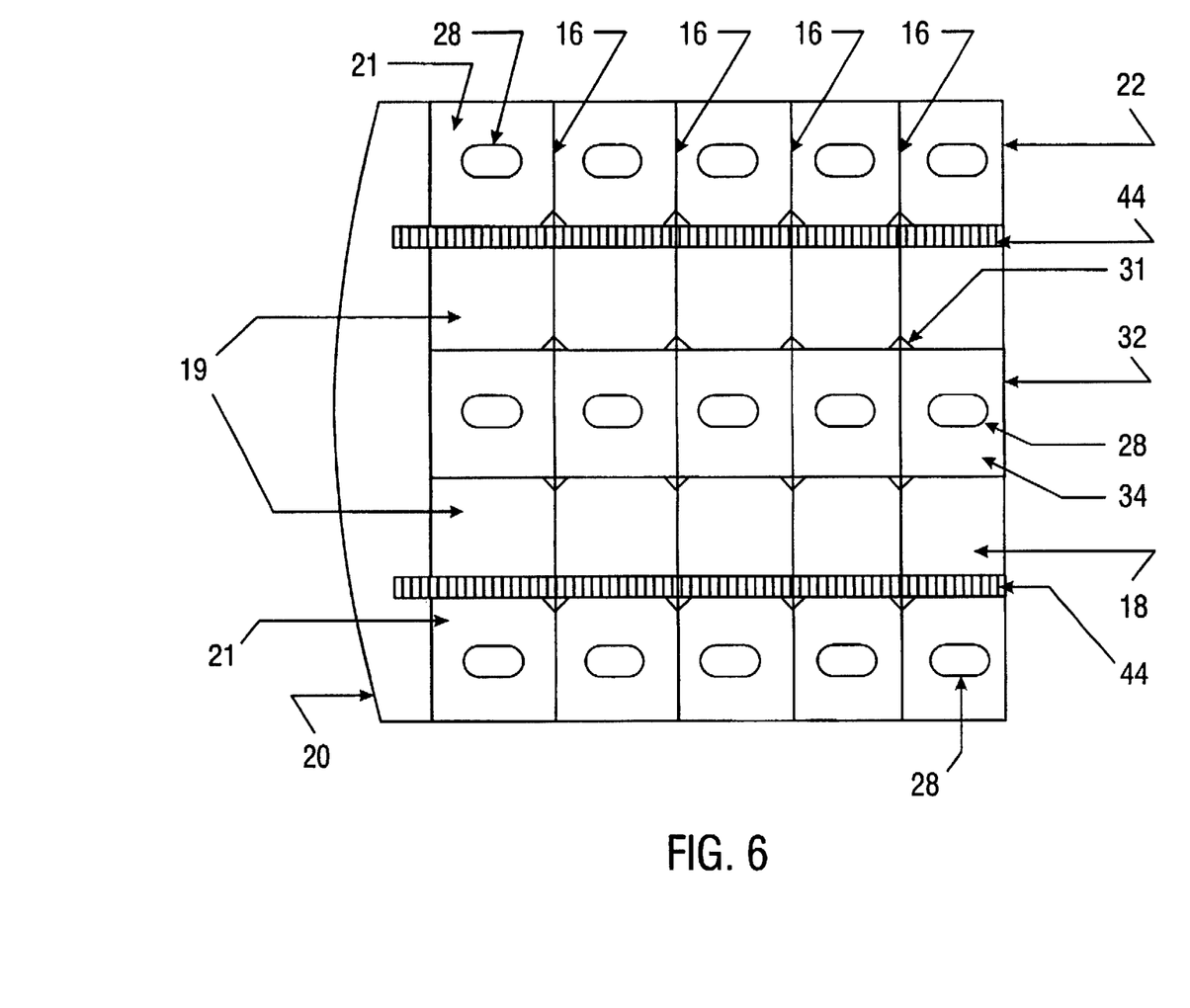
FIG. 6 is a top sectional view of the tank, showing the location of the baffles and corresponding orifices, as well as access ports.

FIG. 6 is a top sectional view of tank 12, showing the placement of horizontal baffles 18 coplanar with the top plate 34 of tunnel 32. Access ports 28 are formed in horizontal baffles 18 at locations between vertical baffles 16, providing access between upper chamber 15 and lower chamber 17. Chamfered corners 30 of horizontal baffles 18 form corner orifices 31 that provide additional fluid communication between upper portion 15 and lower portion 17 of tank 12. Front head or plate 20 and rear bulkhead or plate 22 are rigidly secured to tunnel 32. Longitudinal baffles 44 are rigidly secured to horizontal baffles 18 between adjacent vertical baffles 16, between vertical baffle 16 and rear bulkhead 22, and between vertical baffle 16 and front bulkhead 20. Chamfered corner 30 of longitudinal baffle 44 forms corner orifice 30 to permit fluid communication between inner portion 19 and outer portion 21 of tank 12. Access ports 28 in tunnel 32 and horizontal baffle 18 are closed by access port covers 29 for effective wave suppression.

Figure 7A:
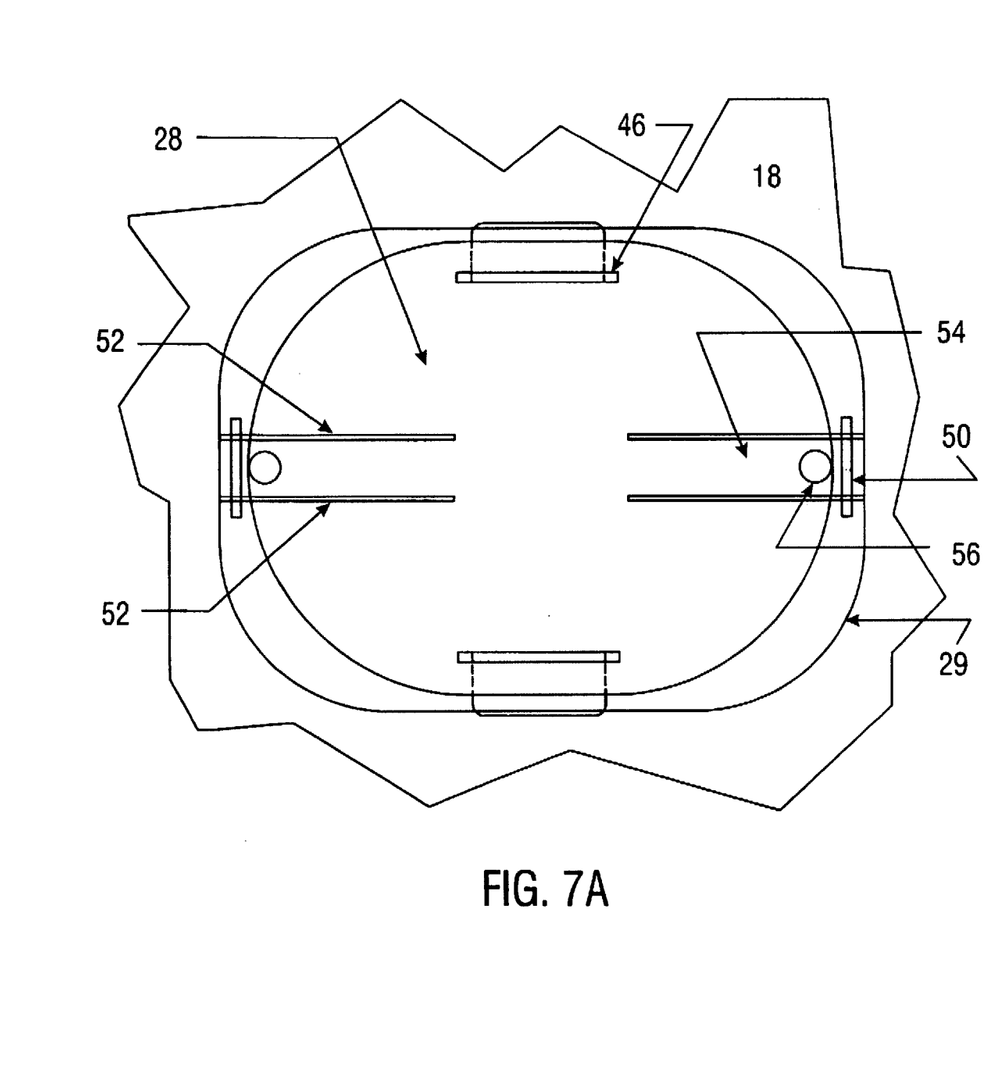
FIG. 7A illustrates a top view of an access cover showing the location of the locking mechanism.

FIG. 7A shows access port cover 29 placed over access port 28 in horizontal baffle 18. Tabs 46 are secured to access port cover 29 along the longitudinal edge of access port cover 29. Integral spring slots 52 are cut into access port cover 29 to form integral spring 54. Locking pin 56 is secured to integral spring 54 equidistant between integral spring slots 52. Mechanical stop 50 is secured to end of access port cover 29 to prevent excessive travel in one direction of integral spring 54 and locking pin 56.

Figure 7B:
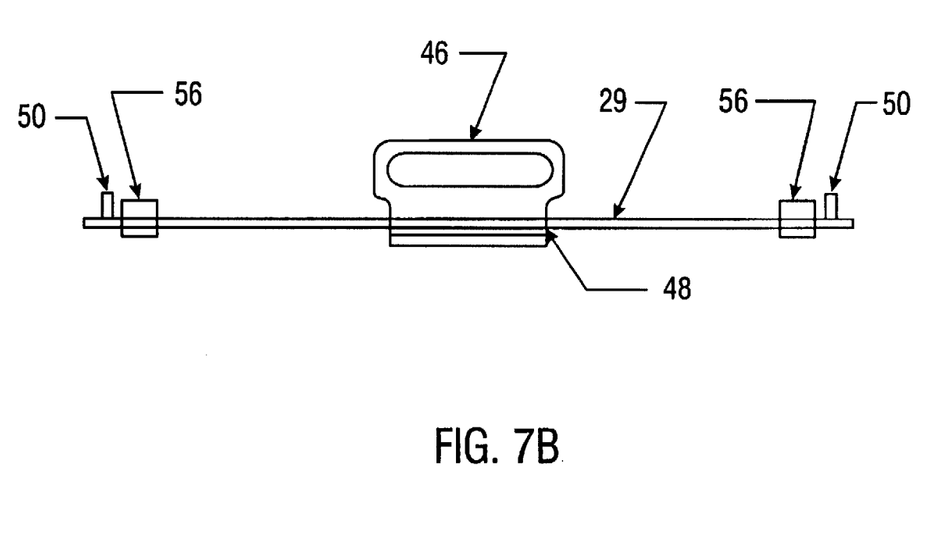
FIG. 7B is a longitudinal side perspective showing access port cover showing the location of tabs, locking pins, and mechanical stops.

FIG. 7B is a longitudinal side perspective showing access port cover 29 with tab 46 secured to access port cover 29, creating slot 48. Locking pin 56 is secured to integral spring 54. Integral spring 54 is prevented from excessive vertical travel by mechanical stop 50.

Figure 7C:
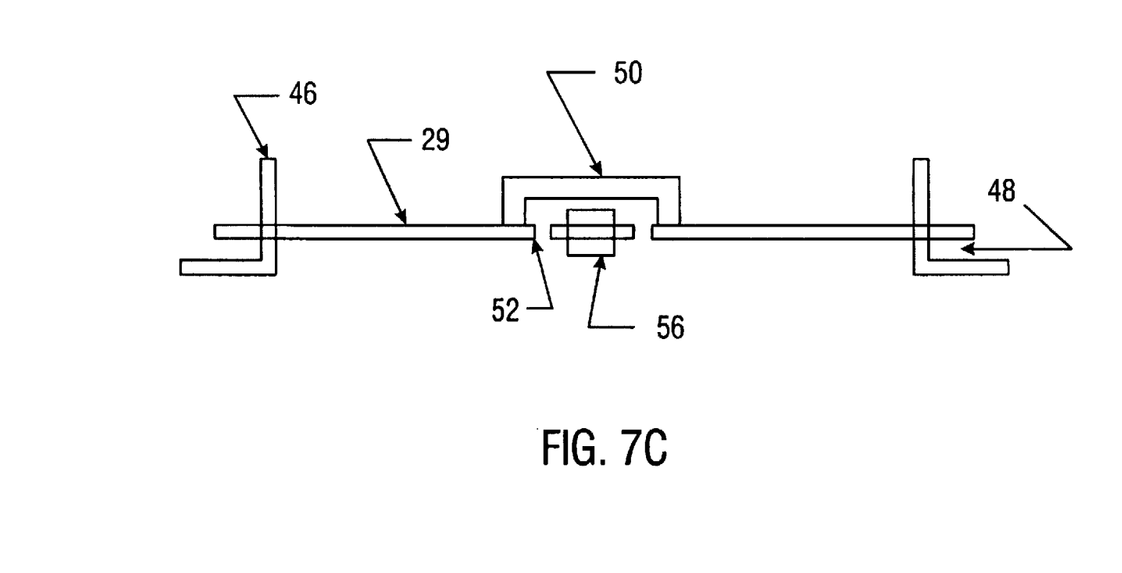
FIG. 7C is a transverse side perspective of access port cover, showing mechanical stops, locking pins, and tabs.

FIG. 7C is a transverse side perspective view of access port cover 29, rotated 90 degrees from the perspective shown in FIG. 7B, showing location of tabs 46, slot 48, and mechanical stops 50. Mechanical stop 50 is constructed so as to prevent excessive vertical movement of integral spring 54 and locking pin 56.

Figure 8:
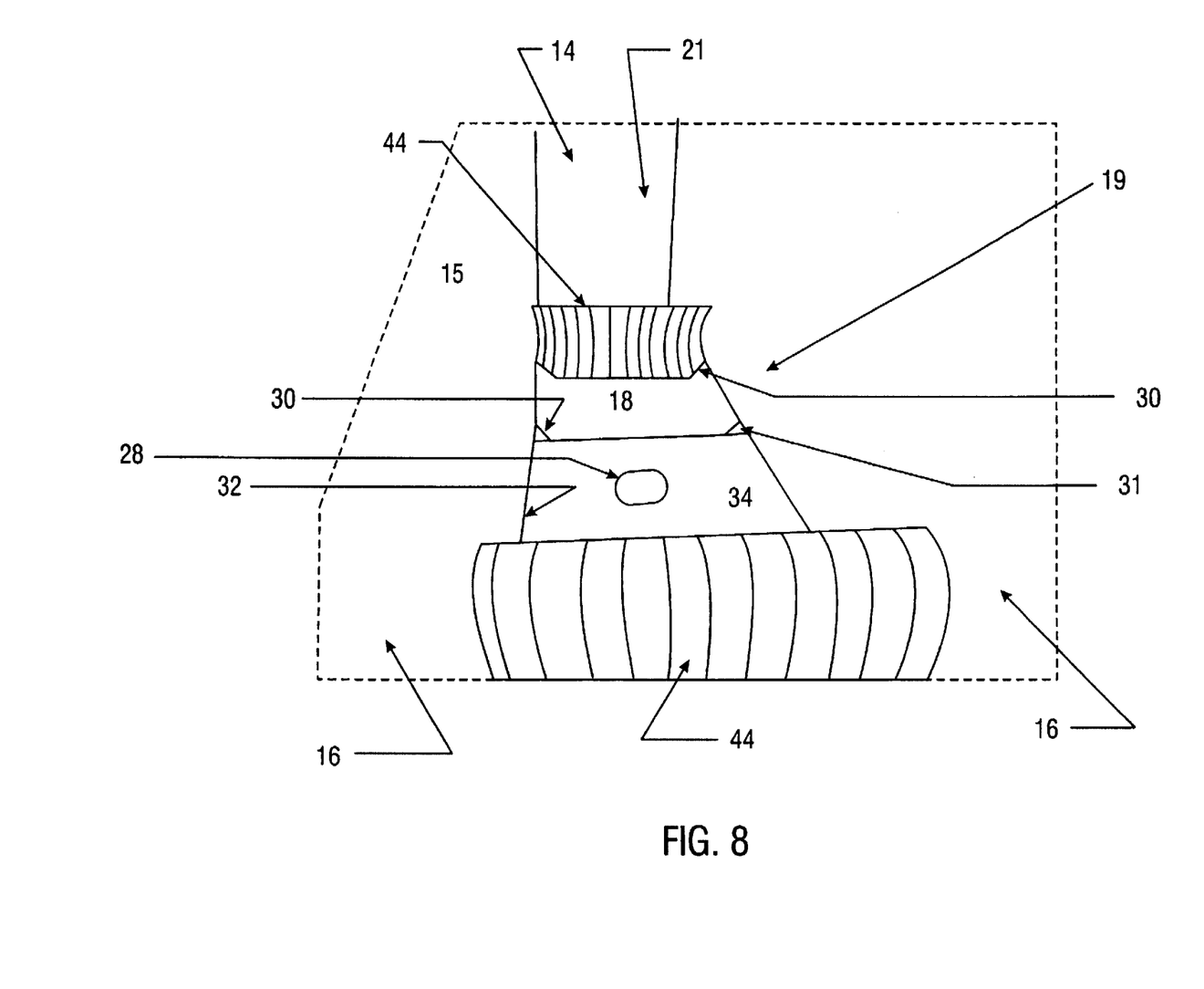
FIG. 8 is a side sectional view of the tank showing the location of the vertical, horizontal, and longitudinal baffles.

FIG. 8 is a side perspective view of an internal portion of tank 12, showing longitudinal baffle 44 rigidly secured between vertical baffles 16. Longitudinal baffle 44 may be curved to match the radius of skin 14, or it may be unbent. Chamfered corner 30 of longitudinal baffle 44 forms corner orifice 30 to permit fluid communication across baffle 44 between inner portion 19 and outer portion 21 of tank 12. Chamfered corner 30 of horizontal baffle 18 forms corner orifices 31 that provide additional fluid communication between upper portion 15 and lower portion 17 of tank 12. Chamfered corners 30 in horizontal baffles 18 allow fluid communication between upper portion 15 and lower portion (not shown) of tank 12. Access port 28 in tunnel top 34 provides access into tunnel 32.

Figure 9:
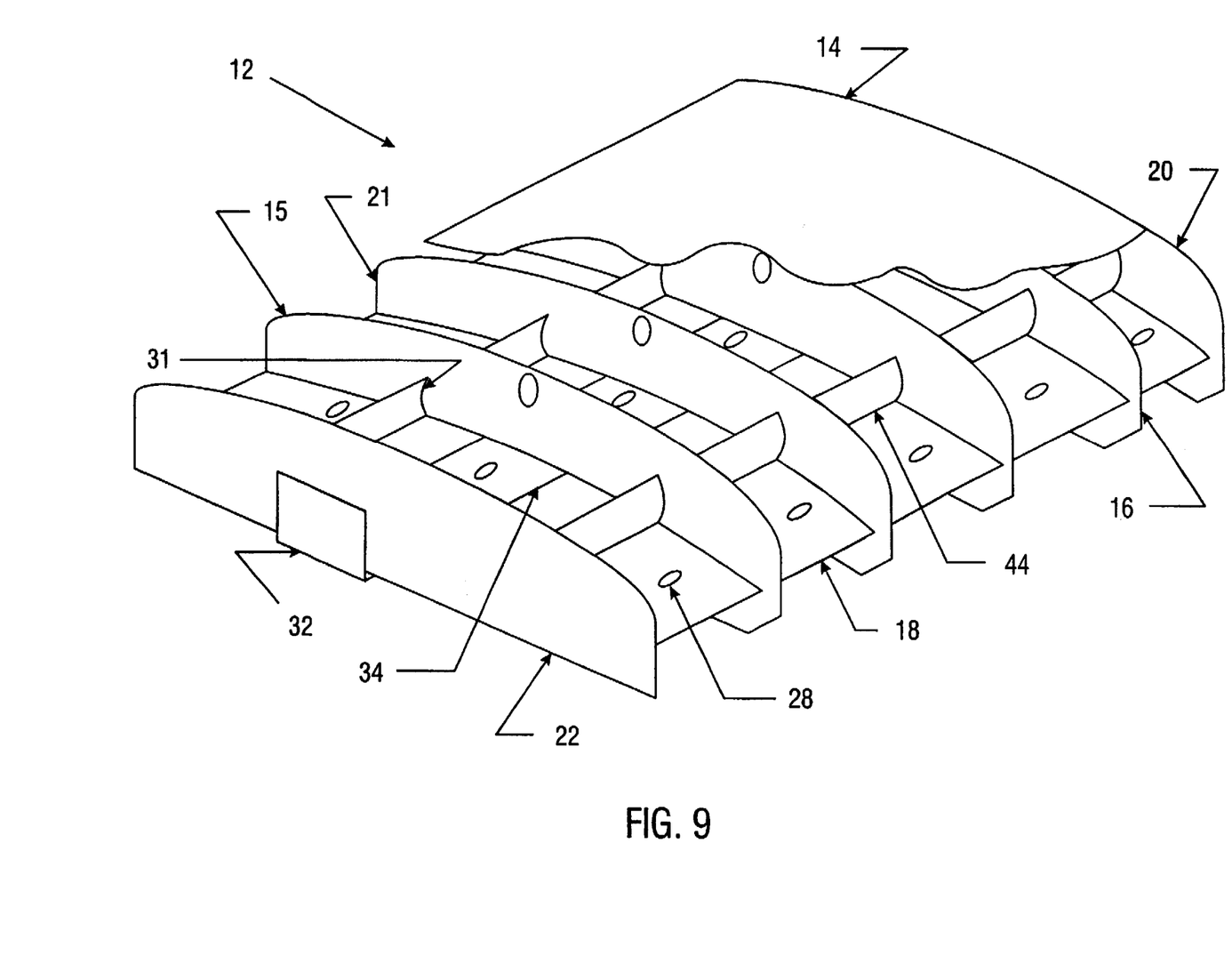
FIG. 9 is a perspective cutaway view of the tank, showing the location of the baffles, orifices, access ports and tunnel.

FIG. 9 is a perspective cutaway view of tank 12, showing the location of vertical baffles 16, horizontal baffles 34 and longitudinal baffles 44. Rear bulkhead 22, vertical baffles 16, and front bulkhead 20 are rigidly secured transversely across tunnel 32. Horizontal baffle 18 is generally coplanar with tunnel top 34, and is rigidly secured to box top 34, vertical baffles 16, and shell 14. Longitudinal baffles 44 are rigidly secured to horizontal baffles 18 between adjacent vertical baffles 16, between vertical baffle 16 and rear bulkhead 22, and between vertical baffle 16 and front bulkhead 20. Longitudinal baffle 44 may be curved to match the radius of skin 14, or it may be unbent. Chamfered corner 30 of longitudinal baffle 44 forms corner orifice 30 to permit fluid communication between inner portion 19 and outer portion 21 of tank 12. Access ports 28 are provided in tunnel top 34 to provide access into tunnel 32. Additional access ports 28 are provided in horizontal baffle 16 for access into upper portion 15 and lower portion 17 of tank 12. Access ports 28 in tunnel 32 and horizontal baffle 18 are closed by access port covers 29, for effective wave suppression. Longitudinal baffle 44 is rigidly secured between vertical baffles 16. Chamfered corner 30 of longitudinal baffle 44 forms corner orifice 30 that permits fluid communication between inner portion 19 and outer portion 21 of tank 12. Shell 14, shown cut away, is shaped to cover baffles 16 and is secured to baffles 16, and front and rear bulkheads 20 and 22, respectively.

The apparatus disclosed and claimed herein can be made and executed without undue experimentation in light of the present disclosure. While the apparatus and methods of this invention have been described in terms of preferred embodiments, it will be apparent to those of skill in the art that variations may be applied to the apparatus and in the steps or in the sequence of steps of the method described herein without departing from the concept, spirit and scope of the invention. More specifically, it will be apparent that certain dimensions of the various components making the invention may be varied to achieve the same or similar results. While configurations depicted in the drawings indicate structures that are parallel to, or perpendicular to adjacent structures or the axis of the tank, the skilled artisan will recognize that the manner of operation of the invention does not require the baffles or other structures to be precisely parallel to each other or the tank axis. The manner of operation of the invention will not be significantly affected if these orientations are not precisely observed. Thus, all similar substitutes and modifications apparent to those skilled in the art are deemed to be within the spirit, scope and concept of the invention as defined by the appended claims.

What is claimed is:

1. A tank for containing and decreasing excessive surging and wave motion of liquids, comprising:
   (a) a shell having an interior and exterior surface;
   (b) a longitudinal tunnel, positioned within the shell and supported by the shell's interior surface, the tunnel comprising a top portion, and at least two side portions, the top portion having at least one access port and one of said side portions having at least one orifice, the tunnel further including at least one transversely oriented internal tunnel baffle rigidly secured to the interior of the tunnel, the tunnel baffle provided with at least one orifice;
   (c) at least one external vertical baffle having at least one orifice, the vertical baffle oriented transversely to the axis of the tank and rigidly secured to the exterior of the tunnel;
   (d) at least one horizontal baffle having at least one orifice and one access port, the horizontal baffle positioned coplanar with the top portion of the tunnel and rigidly secured to the exterior of the tunnel, the vertical baffle, and the shell; and
   (e) at least one longitudinal baffle rigidly secured to the at least one horizontal baffle and the at least one vertical baffle, the longitudinal baffle extending along the longitudinal axis of the tank.

2. The tank according to claim 1, wherein the at least one longitudinal baffle is located at approximately the same height as the tunnel and extends upwardly and is curved generally parallel to the interior surface of the shell.

3. The tank according to claim 1, wherein the at least one vertical baffle, the at least one horizontal baffle, the at least one longitudinal baffle, and the at least one transverse tunnel baffle have at least one corner chamfered.

4. The tank according to claim 3, wherein the angle of the at least one chamfered corner is about 45 degrees.

5. The tank according to claim 1, wherein the shell is mounted onto a support frame.

6. The tank according to claim 5, wherein the ratio of shell width to support frame width is between about 8:1 and 2:1.

7. The tank according to claim 6, wherein the ratio of shell width to support frame width is about 5:1.

8. The tank according to claim 1, wherein the height of the tunnel is between about ¼ and about ½ the vertical height above the base of the shell interior.

9. The tank according to claim 8, wherein the vehicle is a truck.

10. The tank according to claim 5, wherein the support frame is attached to a vehicle.

11. The tank according to claim 10, wherein the height of the tunnel is about ⅓ of the vertical height of the shell.

12. The tank according to claim 1 further comprising at least one access cover removably attached over the at least one access port.

13. The tank according to claim 12, wherein the access cover is self-locking.

14. The tank according to claim 13, wherein the access cover includes at least one integral spring secured to at least one locking pin.

15. The tank according to claim 14, wherein the at least one integral spring is formed from at least one pair of integral spring slots cut into the access port cover.

16. The tank according to claim 15, wherein the at least one locking pin is secured to the at least one integral spring at a point about equidistant between the at least one pair of integral spring slots.

17. The tank according to claim 12, wherein the at least one access port is of an elliptical shape, and the at least one access cover is of an elliptical shape or a rectangular shape.

18. The tank according to claim 17, wherein the at least one access cover is of an elliptical shape.

19. The tank according to claim 12, wherein the access port cover includes:
   (a) tabs securably attached along a longitudinal edge of the access port cover;
   (b) at least one pair of integral spring slots cut into the access port cover to form at least one integral spring;
   (c) at least one locking pin secured to the integral spring about equidistant between said at least one pair of integral spring slots; and
   (d) at least one mechanical stop secured to at least one end of the access port cover.

* * * * *